United States Patent
Tsai

(10) Patent No.: US 11,028,890 B2
(45) Date of Patent: Jun. 8, 2021

(54) WHEEL CYLINDER ADJUSTER

(71) Applicant: Chien Yu Hong Co., Ltd., Taichung (TW)

(72) Inventor: Chang-Ta Tsai, Taichung (TW)

(73) Assignee: Chien Yu Hong Co., Ltd., Taichung (TW)

( * ) Notice: Subject to any disclaimer, the term of this patent is extended or adjusted under 35 U.S.C. 154(b) by 253 days.

(21) Appl. No.: 16/429,190

(22) Filed: Jun. 3, 2019

(65) Prior Publication Data

US 2020/0240482 A1    Jul. 30, 2020

(30) Foreign Application Priority Data

Jan. 25, 2019   (TW) .................................. 108201278

(51) Int. Cl.
| | |
|---|---|
| *F16D 65/00* | (2006.01) |
| *B23P 19/04* | (2006.01) |
| *F16H 25/14* | (2006.01) |
| *B25B 27/00* | (2006.01) |
| *B60S 5/00* | (2006.01) |

(52) U.S. Cl.
CPC .......... *F16D 65/0043* (2013.01); *B23P 19/04* (2013.01); *B25B 27/0035* (2013.01); *F16H 25/14* (2013.01); *B60S 5/00* (2013.01)

(58) Field of Classification Search
CPC ...... F16D 65/0043; B60T 17/221; B60S 5/00; B25B 27/0035; B23P 19/04; F16H 25/14
See application file for complete search history.

(56) References Cited

U.S. PATENT DOCUMENTS

| | | | | |
|---|---|---|---|---|
| 6,095,017 A | * | 8/2000 | Long | ................... F16D 65/0043 81/176.15 |
| 9,376,300 B2 | * | 6/2016 | Yang | ...................... B66F 19/00 |
| 9,511,487 B2 | | 12/2016 | Chen | |
| 2013/0263704 A1 | * | 10/2013 | Chen | ................... B25B 27/0035 81/177.5 |
| 2015/0033914 A1 | * | 2/2015 | Chen | ................... B25B 27/0035 81/52 |
| 2017/0282338 A1 | * | 10/2017 | Wang | .................. F16D 65/0043 |

\* cited by examiner

*Primary Examiner* — Matthew P Travers
(74) *Attorney, Agent, or Firm* — Alan D. Kamrath; Karin L. Williams; Mayer & Williams PC

(57) ABSTRACT

A wheel cylinder adjuster includes a rotational disc, an axle, two guiding discs and two groups of claws. An oval slot extends in a first side of the rotational disc. A flower-shaped slot extends in a second side of the rotational disc. The axle is inserted in the axial aperture of the rotational disc. The first guiding disc is connected to the axle against the first side and includes two opposite radial slots. The second guiding disc is connected to the axle against the second side and includes three radial slots. Each claw in the first group is movably inserted in one of the slots of the first guiding disc and includes an insert movably inserted in the oval slot. Each claw in the second group is movably inserted in one of the slots of the second guiding disc and includes an insert movably inserted in the flower-shaped slot.

2 Claims, 9 Drawing Sheets

US 11,028,890 B2

WHEEL CYLINDER ADJUSTER

BACKGROUND OF INVENTION

1. Field of Invention

The present invention relates to a brake system and, more particularly, to a wheel cylinder adjuster.

2. Related Prior Art

Taiwanese Patent I533978 discloses a conventional wheel cylinder adjuster including a body 10 formed with a connective portion 11 at the center. Two pivotal holders 30 are connected to a first side of the body 10 and three pivotal holders 30 are connected to a second side of the body. A disc 20 is located next to the pivotal holders 30 on the first side of the body 10. Another disc 20 is located next to the pivotal holders 30 on the second side of the body 10. The disc 20 on the first side of the body 10 includes two radial slots 21. The disc 20 on the second side of the body 10 includes three radial slots 21. Each of the pivotal holders 30 includes a claw 32 movably inserted in one of the radial slots 21. In use, a driving mechanism is connected to the connective portion 11 to rotate the body 10 so that the pivotal holders 30 are pivoted as the claws 32 are moved along the radial slots 21. The claws 32 are inserted in recesses made in the surface of a wheel cylinder to hold the wheel cylinder. This conventional wheel cylinder adjuster can be used with various wheel cylinders of various sizes made by various manufacturers.

It should be noted that the connective portion 11 is made in one piece with the body 10. Moreover, the body 11 is made thick to contain the pivotal holders 30. Furthermore, the pivotal holders 30 are structurally complicated because each of them includes a linking element 31, the claw 32 and a pin 35. Accordingly, the wheel cylinder adjuster is heavy. The pivotal holders 30 can be pivoted for a limited angle due to the use of the radial slots 21, and this is inconvenient for the operation. In addition, it requires a large torque to drive the pivotal holders 30 to hold a wheel cylinder because of the configuration and direction of the pivotal holders 30.

The present invention is therefore intended to obviate or at least alleviate the problems encountered in prior art.

SUMMARY OF INVENTION

It is the primary objective of the present invention to provide a light, compact, convenient wheel cylinder adjuster.

To achieve the foregoing objective, the wheel cylinder adjuster includes a rotational disc, an axle, two guiding discs and two groups of claws. The rotational disc includes an axial aperture, a first side, an oval slot made in the first side centered at the axial aperture, a second side, and a flower-shaped slot made in the second side centered at the axial aperture. The flower-shaped slot includes at least three arched slots connected to one another at connective points. The axle is rotationally inserted in an axial aperture of the rotational disc. The first guiding disc is connected to the axle against the first side and formed with two opposite slots. The second guiding disc is connected to the axle against the second side and formed with at least three slots separated from one another by identical angles. Each of the claws in the first group is movably inserted in one of the slots of the first guiding disc and includes an axial insert movably inserted in the oval slot. Each of the claws in the second group is movably inserted in one of the slots of the second guiding disc and includes an axial insert movably inserted in the flower-shaped slot. A connective mechanism is used to cause the axle and the first and second guiding discs to rotate together.

In another aspect, the connective mechanism includes keys and recesses amid the axle and the first and second guiding discs.

Advantageously, a rotating mechanism can be used to drive the axle for 360 degrees to rotate the first and second guiding discs so that the first and second groups of claws are moved toward or away from one another along the radial slots under guidance of the oval and flower-shaped slots. The first and second groups of claws can match various wheel cylinders of various vehicles made by various manufacturers. The claws can be inserted in recesses made in the surfaces of various wheel cylinders of various sizes to hold the wheel cylinders.

In comparison with the body disclosed in Taiwanese Patent 1533978, which is thick to contain the pivotal holders, the rotational disc of the present invention is thin for using the oval and flower-shaped slots to contain the claws.

In comparison with the pivotal holders disclosed in Taiwanese Patent 1533978, which perform poorly in transmitting forces, the claws of the present invention perform excellently in transmitting forces.

In comparison with the connective portion disclosed in the Taiwanese Patent 1533978, which is rotatable relative to the discs, the axle of the present invention is rotatable with the first and second guiding discs.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
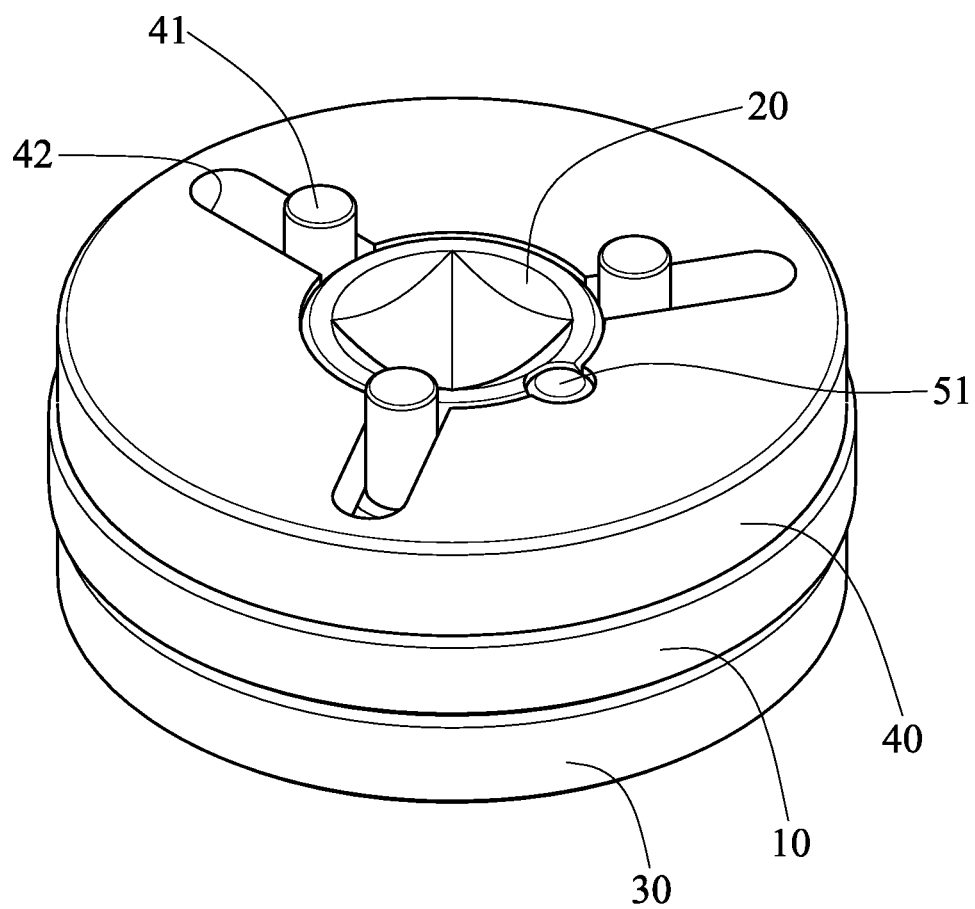
FIG. 1 is a perspective view of a wheel cylinder adjuster according to the preferred embodiment of the present invention.
Figure 2:
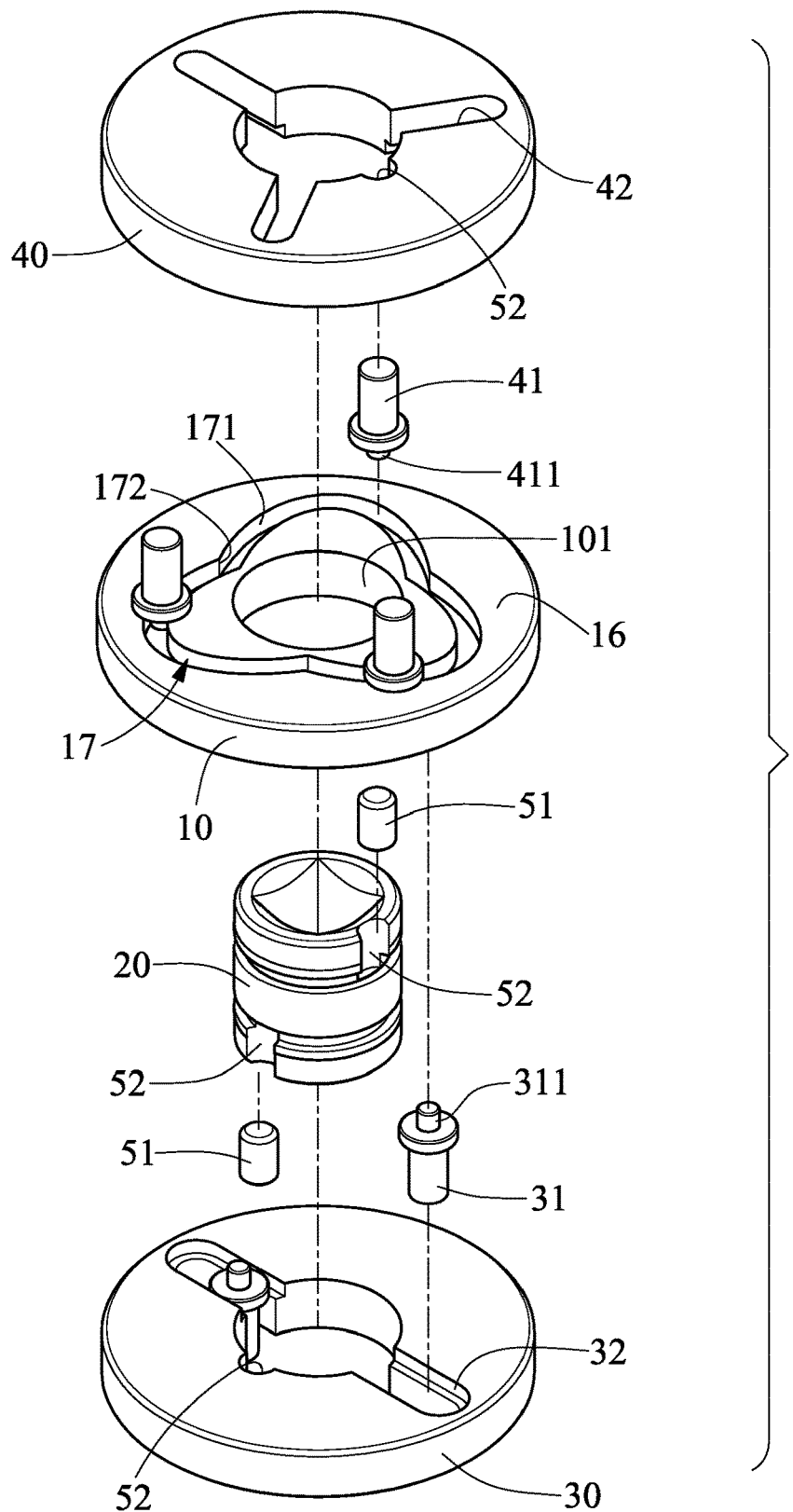
FIG. 2 is an exploded view of the wheel cylinder adjuster depicted in FIG. 1.
Figure 3:
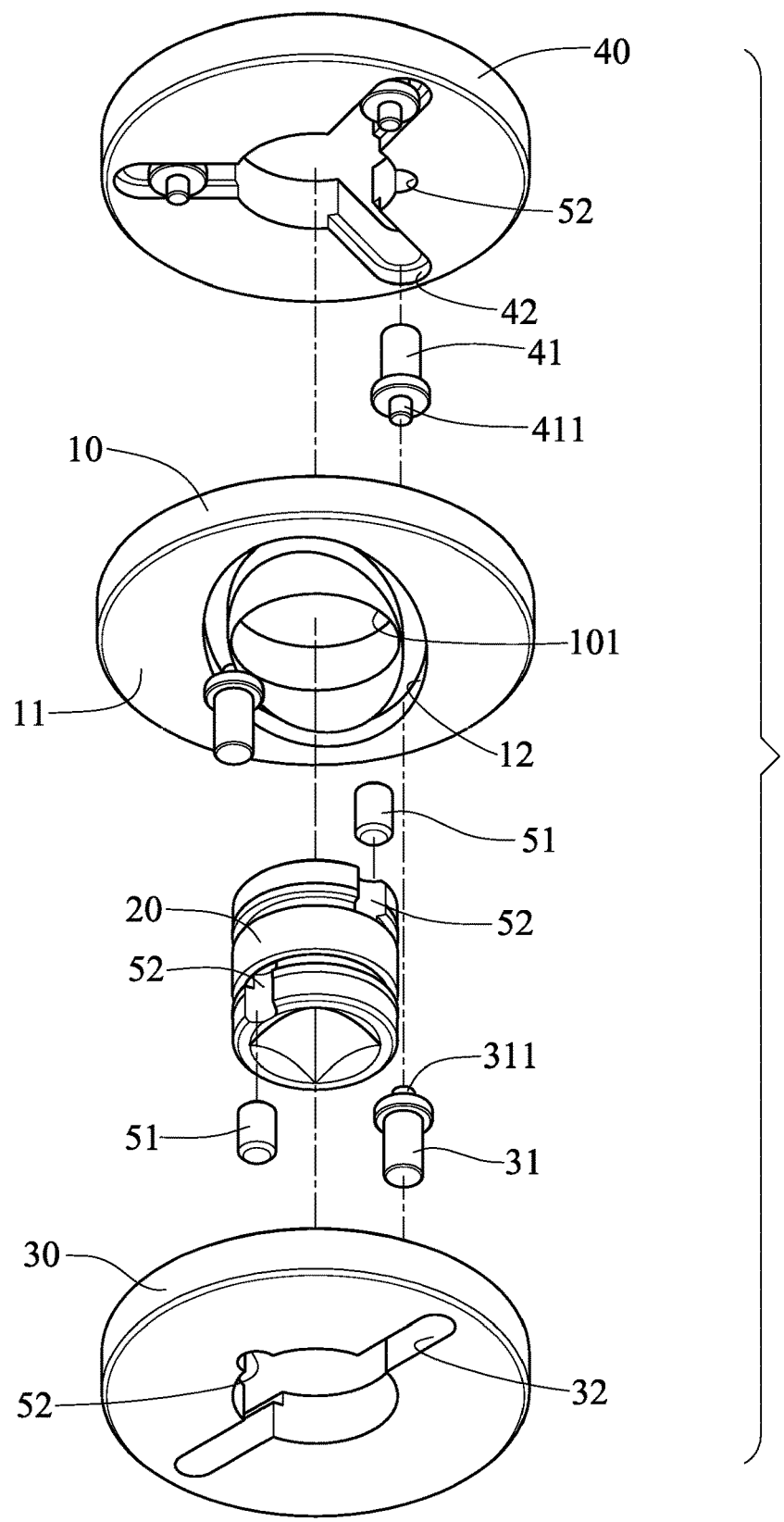
FIG. 3 is another exploded view of the wheel cylinder adjuster depicted in FIG. 1.
Figure 4:
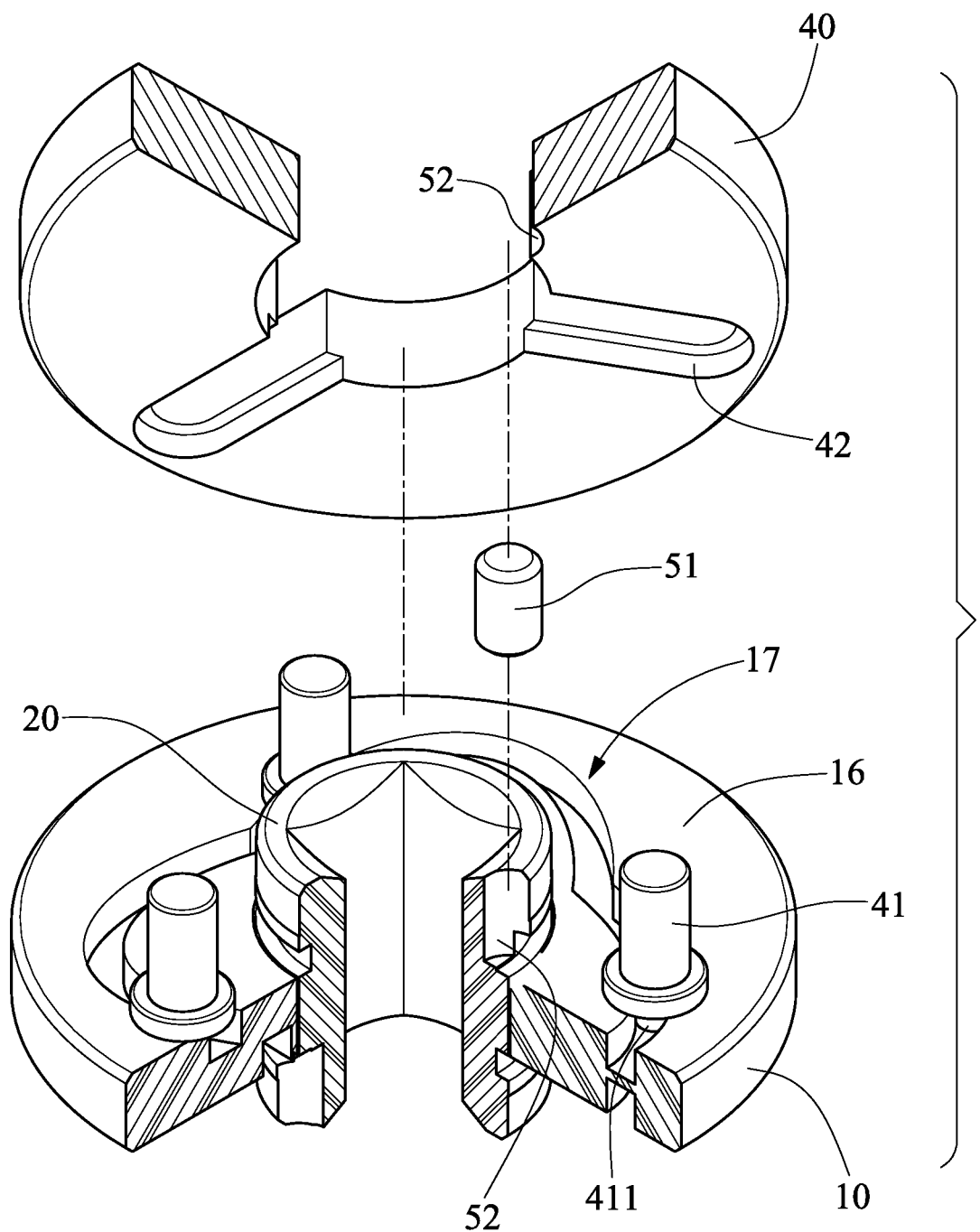
FIG. 4 is a partial and cut-away view of the wheel cylinder adjuster shown in FIG. 1.
Figure 5:
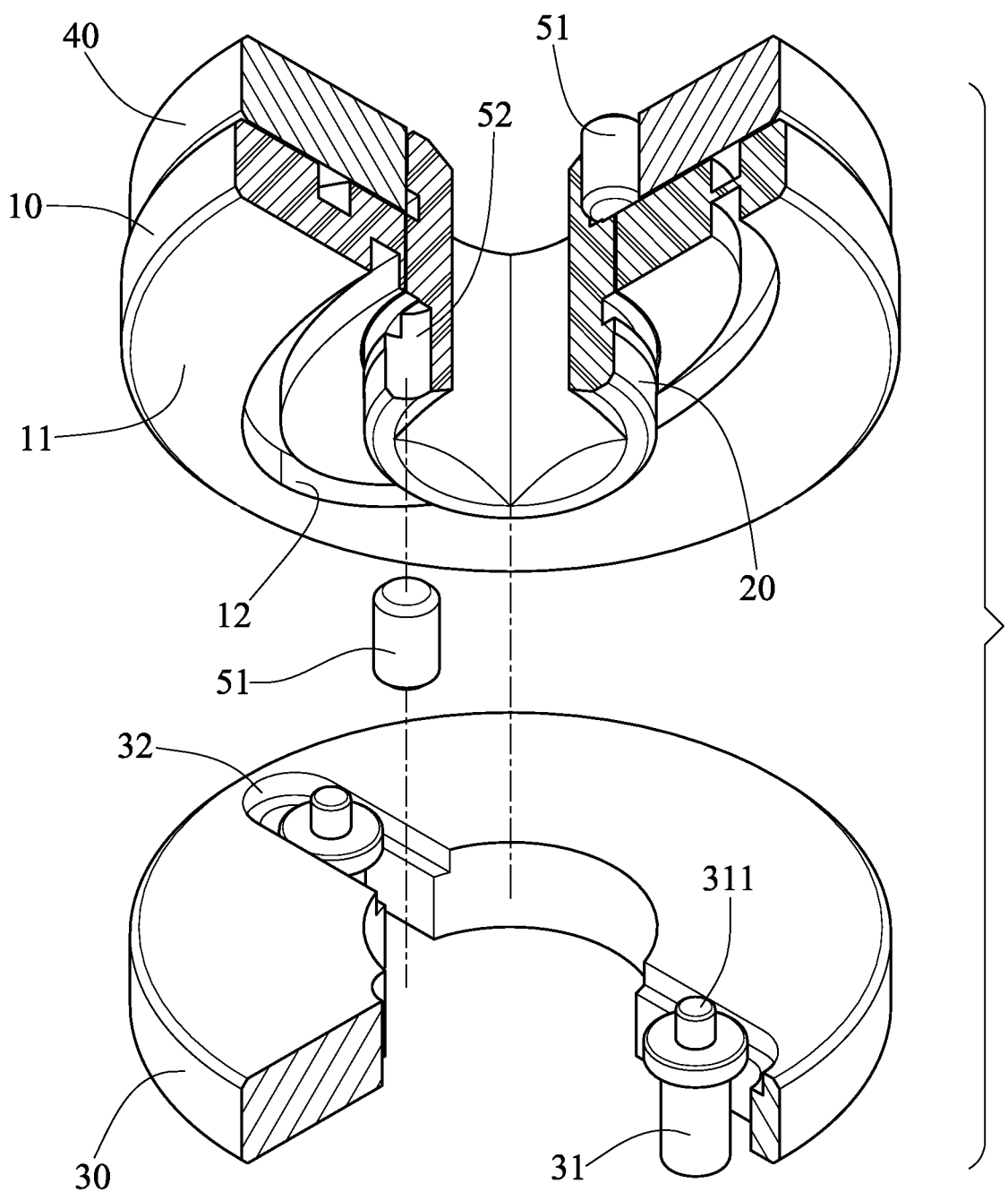
FIG. 5 is another partial and cut-away view of the wheel cylinder adjuster shown in FIG. 1.
Figure 6:
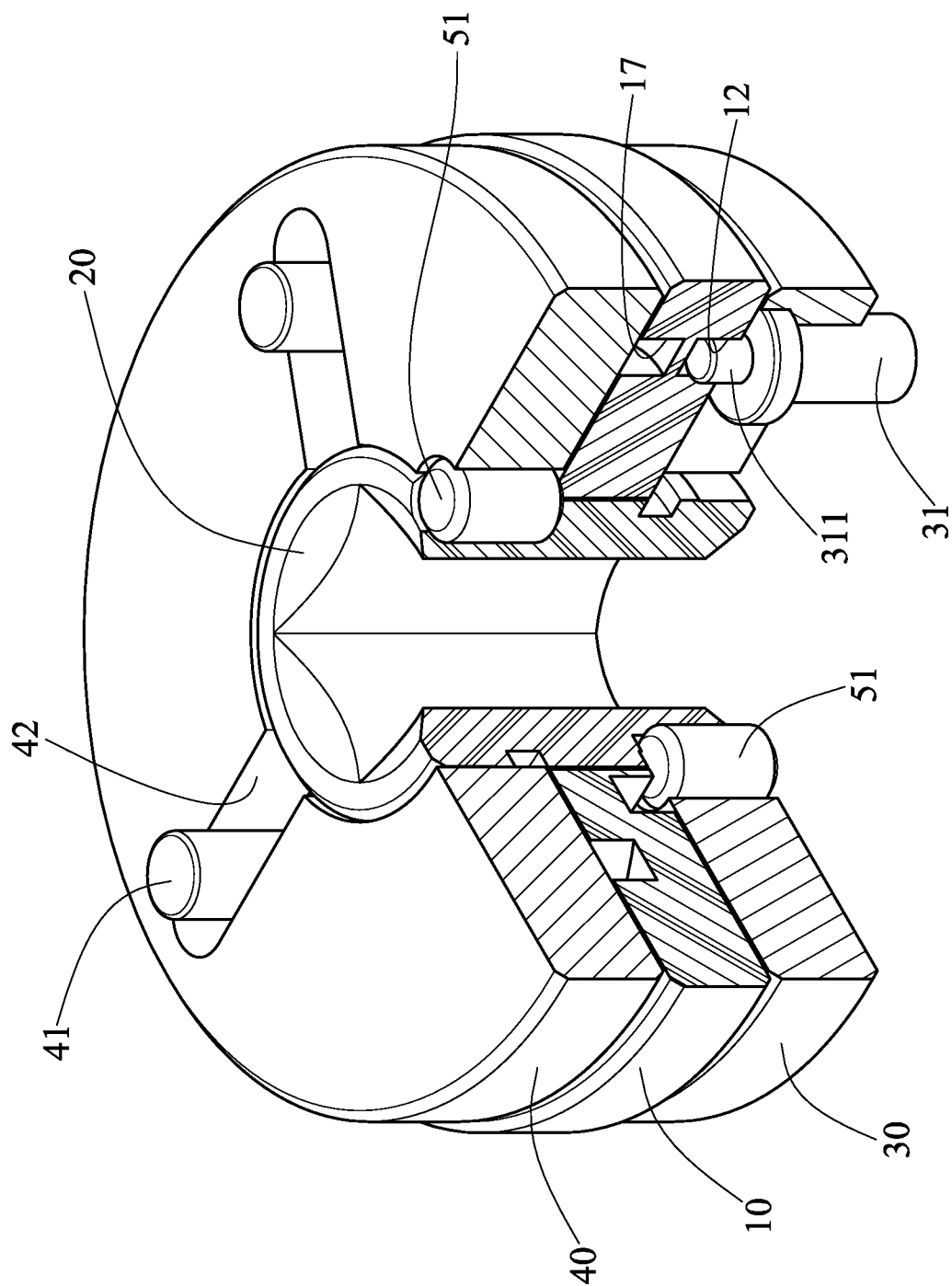
FIG. 6 is a cut-away view of the wheel cylinder adjuster depicted in FIG. 1.
Figure 7:
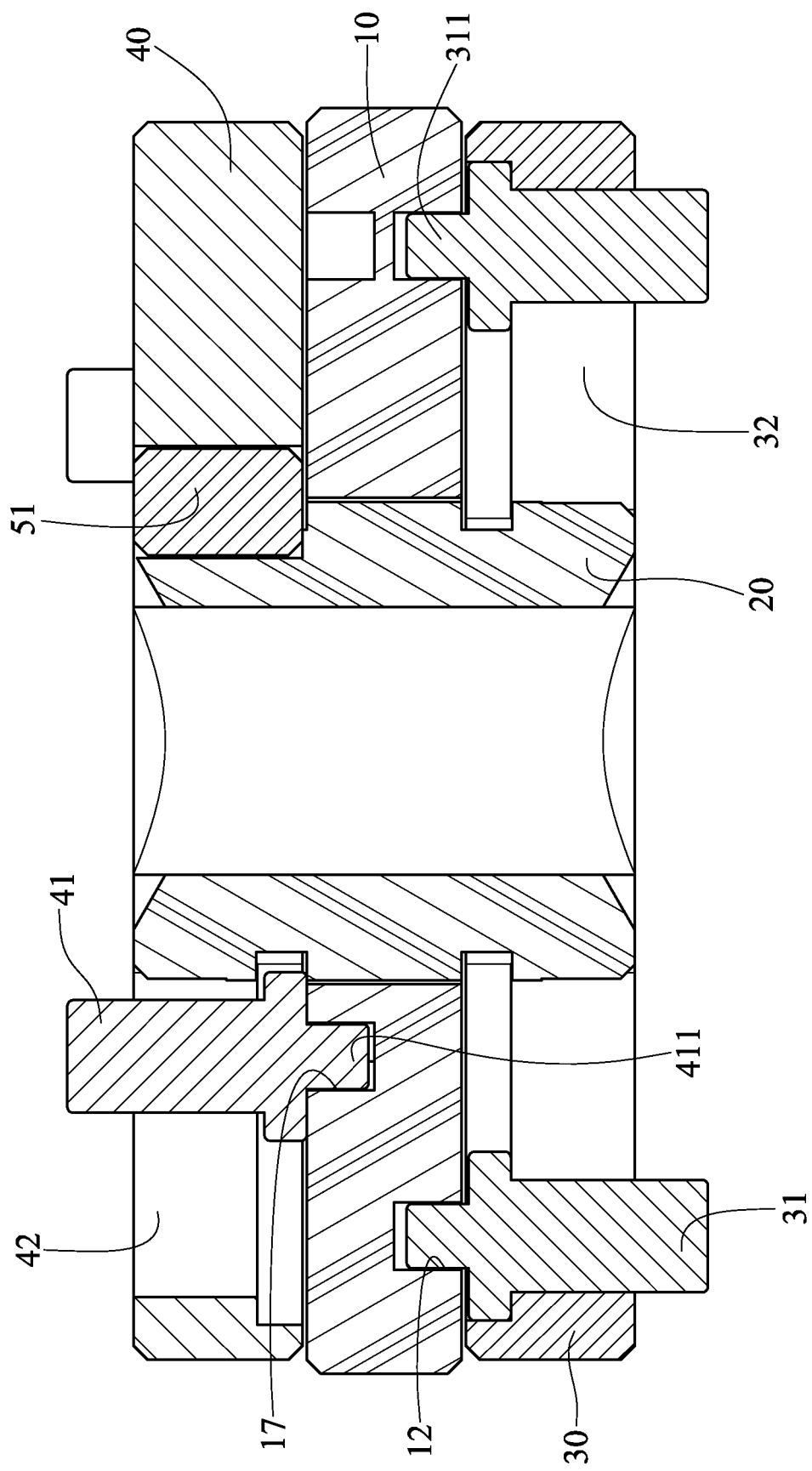
FIG. 7 is a cross-sectional view of the wheel cylinder adjuster shown in FIG. 1.

Referring to FIGS. 1 through 3, a wheel cylinder adjuster includes a rotational disc 10, an axle 20, two guiding discs 30 and disc 40, several claws 31 and several claws 41 in accordance with the preferred embodiment of the present invention. The axle 20 is rotationally inserted in an axial aperture 101 of the rotational disc 10. The rotational disc 10 includes two opposite sides 11 and 16. The guiding discs 30 and 40 are connected to the axle 20 against the sides 11 and 16 of the rotational disc 10, respectively. A connective mechanism causes the axle 20, the first guiding disc 30 and the second guiding disc 40 to rotate together. Preferably, the connective mechanism includes keys 51 and recesses 52 amid the axle 20, the first guiding disc 30 and the second guiding disc 40 (FIGS. 4 through 7).

Referring to FIGS. 3 and 5 to 7, the face 11 of the rotational disc 10 includes an oval slot 12 centered at the axle 20. The guiding disc 30 includes two opposite radial slots 32. A claw 31 is movably inserted in each of the radial slots 32. The claws 31 extend beyond a face of the first guiding disc 30. Each of the claws 31 includes an axial insert 311 movably inserted in the oval slot 12.

Referring to FIGS. 2, 4, 6 and 7, the face 16 of the rotational disc 10 includes a flower-shaped slot 17 centered at the axle 20. The flower-shaped slot 17 includes at least three arched slots 171 connected to one another at connective points 172. The second guiding disc 40 includes three radial slots 42 separated from one another by identical angles. A claw 41 is movably inserted in each of the radial slots 42. The claws 41 extend beyond a face of the guiding disc 40. Each of the second claws 41 includes an axial insert 411 movably inserted in the flower-shaped slot 17.

Figure 8:
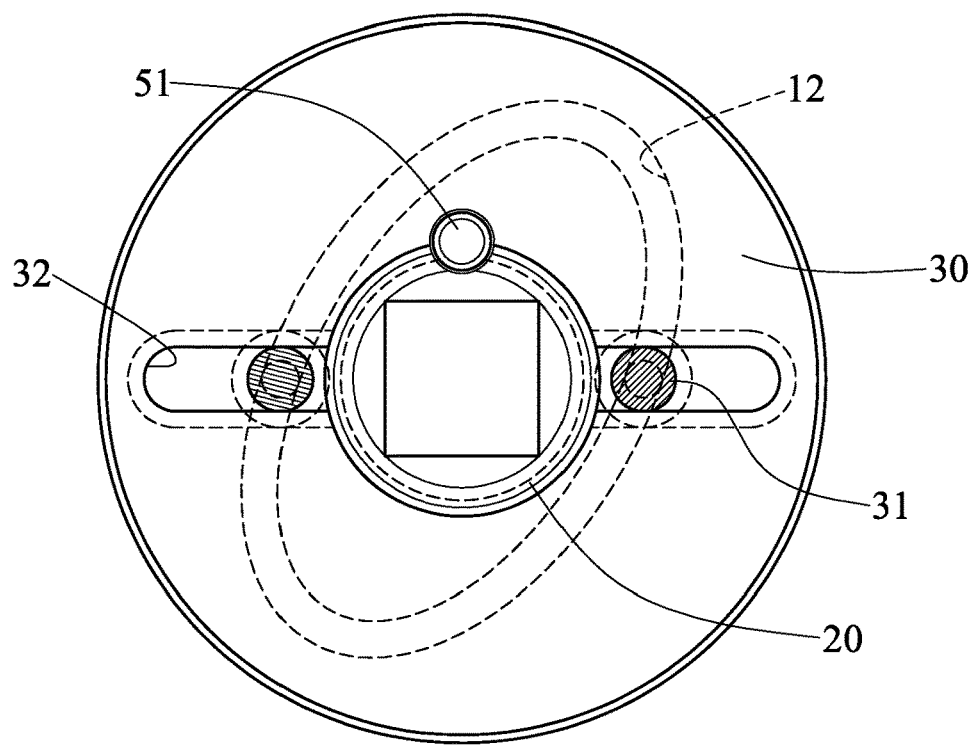
FIG. 8 is a top view of an oval slot and a first claw of the wheel cylinder adjuster shown in FIG. 1.
Figure 9:
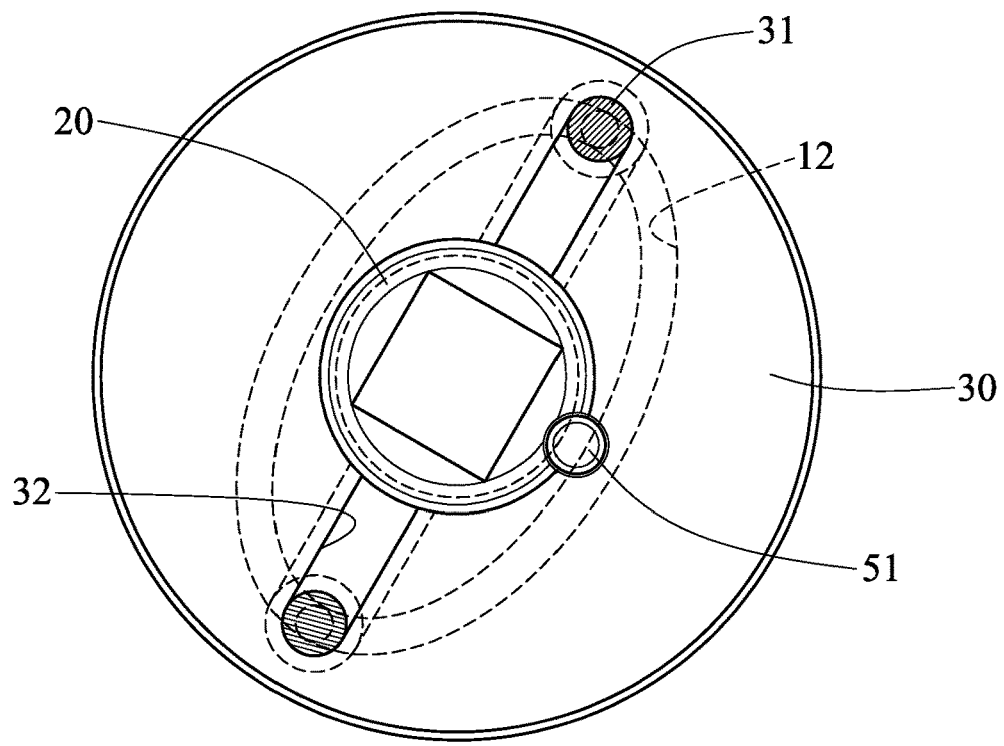
FIG. 9 is a top view of the oval slot and the first claw in another position than shown in FIG. 8.
Figure 10:
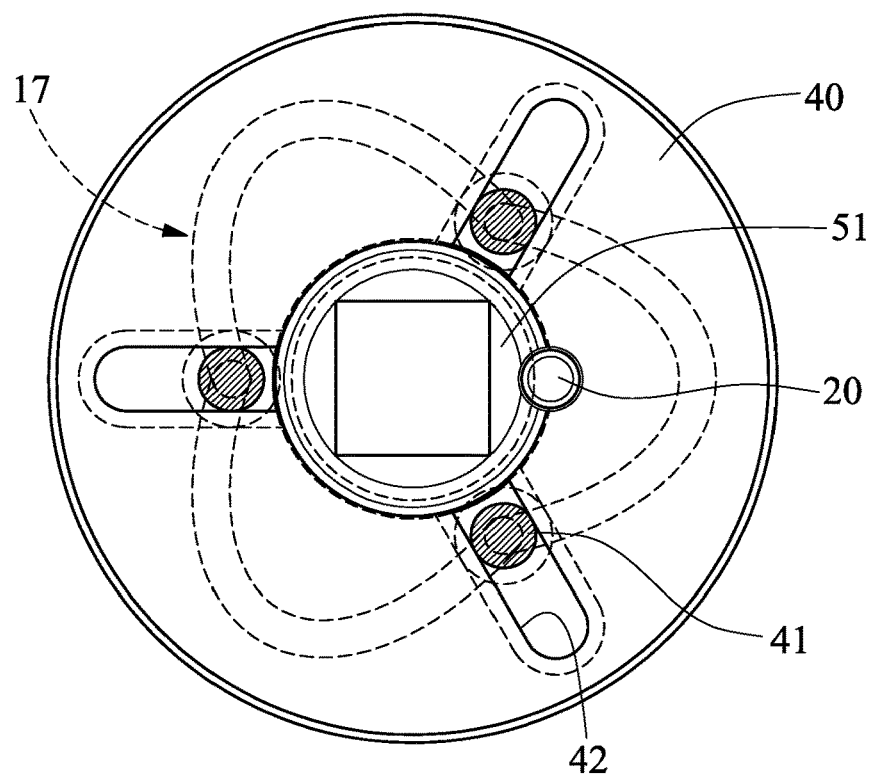
FIG. 10 is a top view of a flower-shaped slot and a second claw of the wheel cylinder adjuster shown in FIG. 1.
Figure 11:
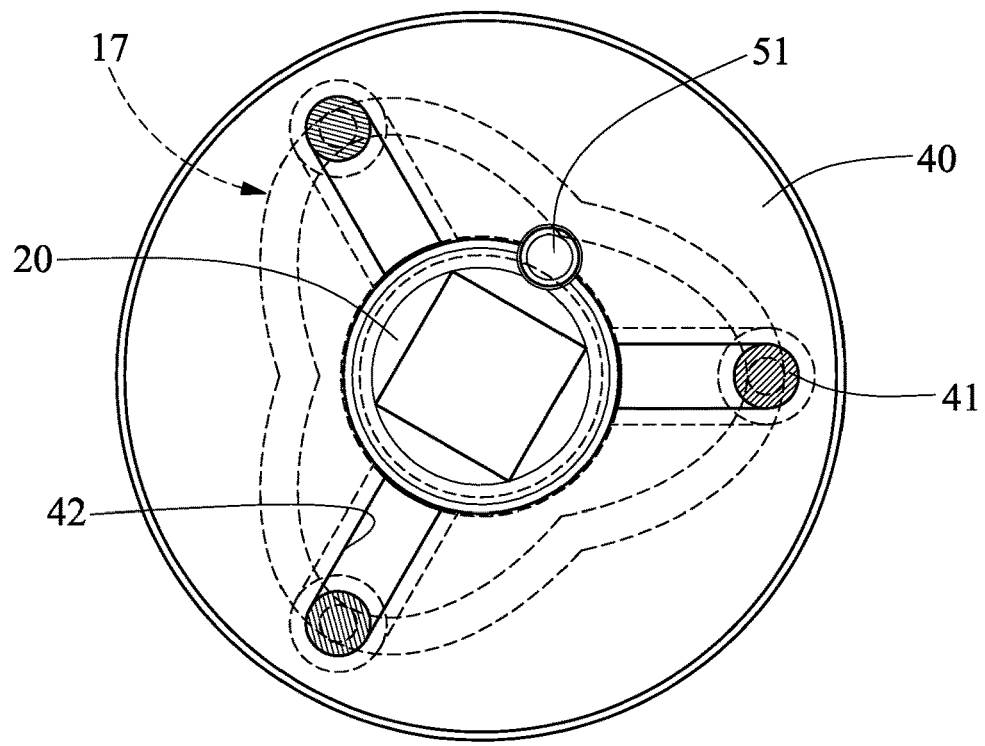
FIG. 11 is a top view of the oval slot and the second claw in another position than shown in FIG. 10.

Referring to FIGS. 8 and 9, the axle 20 is rotated for 360 degrees clockwise or counterclockwise by a rotating mechanism (not shown) so that the axle 20 rotates the guiding discs 30 and 40 at the same time. In the process, the oval slot 12 and the flower-shaped slot 17 guide the claws 31 and the claws 41 to move toward or away from one another along the radial slots 32 and the radial slots 42, respectively. For example, as the claws 31 and the claws 41 move toward the axle 20 along the oval slot 12 and the flower-shaped slot 17, the claws 31 and the claws 41 respectively move toward their centers. The claws 31 move away from their center while moving away from the axle 20 along the oval slot 12. The claws 41 move away from their center while moving away from the axle 20 along the flower-shaped slot 17. Thus, the claws 31 of the guiding disc 30 and the claws 41 of the guiding disc 40 can be used with various wheel cylinders of various vehicles made by various manufacturers. Moreover, with the movement toward or away from one another, the claws can be inserted in recesses made in the surfaces of wheel cylinders of various sizes to facilitate detachment and attachment of the wheel cylinders.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:
1. A wheel cylinder adjuster comprising:
a rotational disc comprising an axial aperture, a first side, an oval slot made in the first side centered at the axial aperture, a second side, and a flower-shaped slot made in the second side centered at the axial aperture, wherein the flower-shaped slot comprises at least three arched slots connected to one another at connective points;
an axle rotationally inserted in the axial aperture of the rotational disc;
a first guiding disc connected to the axle against the first side and formed with two opposite radial slots;
a second guiding disc connected to the axle against the second side and formed with at least three radial slots separated from one another by identical angles;
a first group of claws each of which is movably inserted in one of the radial slots of the first guiding disc and comprises an axial insert movably inserted in the oval slot;
a second group of claws each of which is movably inserted in one of the radial slots of the second guiding disc and comprises an axial insert movably inserted in the flower-shaped slot; and
a connective mechanism for causing the axle and the first and second guiding discs to rotate together.

2. The wheel cylinder adjuster according to claim 1, wherein the connective mechanism comprises keys and recesses amid the axle, the first guiding disc and the second guiding disc.

* * * * *